US009146992B2

(12) United States Patent
Zhou

(10) Patent No.: US 9,146,992 B2
(45) Date of Patent: Sep. 29, 2015

(54) ENRICHING WEB RESOURCES

(75) Inventor: Xin Zhou, Beijing (CN)

(73) Assignee: Google Inc., Mountain View, CA (US)

( * ) Notice: Subject to any disclaimer, the term of this patent is extended or adjusted under 35 U.S.C. 154(b) by 931 days.

(21) Appl. No.: 13/349,802

(22) Filed: Jan. 13, 2012

(65) Prior Publication Data

US 2012/0117049 A1 May 10, 2012

Related U.S. Application Data

(63) Continuation of application No. PCT/CN2010/071756, filed on Apr. 14, 2010.

(51) Int. Cl.
*G06F 7/00* (2006.01)
*G06F 17/30* (2006.01)

(52) U.S. Cl.
CPC ................ *G06F 17/30864* (2013.01)

(58) Field of Classification Search
USPC ........................................................ 707/706
See application file for complete search history.

(56) References Cited

U.S. PATENT DOCUMENTS

| 2008/0244408 | A1* | 10/2008 | King et al. | 715/719 |
| 2009/0193352 | A1* | 7/2009 | Bunn | 715/780 |
| 2009/0327235 | A1* | 12/2009 | Coladonato et al. | 707/3 |
| 2010/0235338 | A1* | 9/2010 | Gabriel | 707/706 |
| 2010/0287474 | A1* | 11/2010 | Feng et al. | 715/716 |
| 2011/0119243 | A1* | 5/2011 | Diamond et al. | 707/706 |
| 2011/0191363 | A1* | 8/2011 | Bell et al. | 707/767 |

FOREIGN PATENT DOCUMENTS

| CN | 101004762 A | 7/2007 |
| EP | 1912164 A2 | 4/2008 |

OTHER PUBLICATIONS

International Search Report for PCT/CN2010/071756, mailed on Jan. 13, 2011, 2 pages.

* cited by examiner

*Primary Examiner* — Hosain Alam
*Assistant Examiner* — Jieying Tang
(74) *Attorney, Agent, or Firm* — Fish & Richardson P.C.

(57) ABSTRACT

Methods, systems, and apparatus, including computer programs encoded on computer storage media, for enriching web resources In one aspect, a method includes: sending a request for a web resource to a web server, receiving the requested document from the web server, sending an identifier of the received web resource to a search engine server, retrieving from a cached storage of the search engine server one or more trigger terms associated with the web resource, extracting the parametric values of each trigger term associated with the web resource, modifying the web resource by embedding an answer box gadget for each trigger term in the web resource using the parametric values of the each trigger term, and rendering the modified web resource in the requesting client device.

33 Claims, 5 Drawing Sheets

ENRICHING WEB RESOURCES

This application is a continuation of International Application Serial No. PCT/CN2010/071756, filed on Apr. 14, 2010, which is incorporated herein by reference.

BACKGROUND

The present specification relates to presenting enriched web pages and, in one particular example, to presenting information relevant to particular terms that occur in a web page.

Web pages may either be static HTML web pages, or dynamic web pages that are created at the server side when they are requested. Examples of dynamic web pages include web pages written in ASP, ASPX, or JSP.

Regardless of how the web pages are created, the content of these web pages will be either predetermined at the time of creation, such as in the case of static HTML web pages, or extracted dynamically from a database that may be updated frequently, such as in the case of ASP, ASPX or JSP server-side web pages. If the user wants to know additional details about particular terms that are included on the web page, these details are, in the typical case, not readily available. For example, when the user views a web page, comes across a place name "London" on the web page, and desires to know what time it is or what the current weather is in "London," the user has no other choice but resort to a search engine or a specialized service provider for such detailed information.

A search engine provider, Google Inc. of Mountain View, Calif., has developed an "answer box" technology, known as OneBox, that has been available for several years. Using this technology, a set of web search features are offered that provide a quick and easy way for a search engine to provide users with information that is relevant to, or that answers, their search query. For example, a search engine may respond to a search query regarding everyday essential information, reference tools, trip planning information, or other information by returning, as the first search result, information responsive to the search query, instead of providing a link and a snippet for each of a number of relevant web pages that may contain information.

FIG. 1 illustrates a conventional answer box in a search result. The first item 101 in the list of search results is the information presented in an answer box for the search query "time London," where the answer box is triggered by the term "time." The search engine has inferred that the user may want to know the current local time in "London" and has therefore retrieved local time information for places that are called "London."

SUMMARY

Initially, this specification refers to terms that, if they were included as part of a search query, would cause a search engine to generate an answer box, as "trigger terms." A trigger term may be a category trigger term associated with a type or category of answer box, such as "movie," "weather," "convert," "how . . . is," "stock price," or the trigger term may be a parameter trigger term, such as a particular person name (to obtain a social network status update), a particular movie name (to obtain show times), a particular location (to obtain weather or time information), or a particular business name (to obtain stock information). Particular category trigger terms may require a parameter, for example where the category trigger term "time" requires a location parameter in order to determine a location for which the time information should be obtained. Alternatively, particular category trigger terms may not require a parameter, for example where the category trigger term "time" infers a parameter (e.g., a default parameter) when a parameter is not explicitly provided.

In generating an answer box for a query, the search engine obtains information that instantly answers the query, or that offers a direct link to an answer for the query. This information, which may be current or real-time information such as current weather, stock price, show time, location or other information, is referred to by this specification as a "parametric value" of a trigger term. A parametric value may, for example, be thought of as the answer box's "answer" to a question implied by the trigger term. In other cases, the parametric value associated with a trigger term is not necessarily real-time information, for example when trigger term is an address and the parametric value is map information for the address.

In general, one innovative aspect of the subject matter described in this specification may be embodied in methods that include the actions of identifying trigger terms from the text of a web page, and obtaining (i.e., receiving or generating) a modified web page that highlights the trigger terms. When the highlighted trigger terms are selected by a user, for example when the user moves a cursor over a highlighted trigger term, the parametric value associated with the trigger term is displayed. In one example, the selection of a highlighted trigger term causes a pop-up window to open, where the pop-up window displays an answer box for the trigger term. Because the modified web page includes an interaction point for the direct manipulation of a trigger term, the modified web page includes what is referred to by this specification as "enriched content."

In general, another innovative aspect of the subject matter described in this specification may be embodied in methods that include the actions of presenting an enriched web resource at a client device. The methods also include the actions of: sending a request for a web resource to a web server, receiving the requested document from the web server, sending an identifier of the received web resource to a search engine server, retrieving from a cached storage of the search engine server one or more trigger terms associated with the web resource, extracting the parametric values of each trigger term associated with the web resource, modifying the web resource by embedding an answer box gadget for each trigger term in the web resource using the parametric values of the each trigger term, and rendering the modified web resource in the requesting client device.

In general, another innovative aspect of the subject matter described in this specification may be embodied in methods that include the actions of presenting an enriched web resource. The methods also include the actions of: sending a request for a web resource to a web server, receiving the requested document from the web server, sending the received web resource to a search engine server, identifying, at the search engine server, a set of trigger terms in the web resource by comparing the words in the document with a reference list of trigger terms, retrieving the corresponding parametric values of each of the identified trigger terms for the web resource, modifying the web resource by embedding an answer box gadget for each trigger term in the web resource using the parametric values of the each trigger term, and rendering the modified web resource in the requesting client device.

Other embodiments of each of these aspects include corresponding systems, apparatus, and computer programs recorded on computer storage devices, each configured to perform the actions of the methods.

These and other embodiments may each optionally include one or more of the following features, alone or in combination. The parametric values of each trigger term include search results of an integrated search on the trigger term; modifying the web resource further includes embedding adjacent to each trigger term in the web resource at least one of the parametric values of the trigger term that are search results; the answer box gadget is represented by an icon that can be selected by a user to invoke an application configured to render a source that is referenced by one of the parametric values; the application is an audio application or a video application; or the answer box gadget displays a popup window that is triggered by a select event on a hyperlink that includes the trigger term as text, a click on an icon adjacent to the trigger term, or a mouse-on event on the trigger term.

In general, another innovative aspect of the subject matter described in this specification may be embodied in methods that include the actions of enriching search results. The methods also include: receiving a search request from a requesting client device, retrieving one or more snippets associated with the search request from cached documents crawled from the Internet, identifying one or more trigger terms in each snippet, extracting one or more parametric values for the one or more trigger terms, modifying each snippet by embedding an answer box gadget for each trigger term in the snippet based on the parametric values of the each trigger term, and rendering the modified one or more snippets in search results in response to the search request. Other embodiments of this aspect include corresponding systems, apparatus, and computer programs recorded on computer storage devices, each configured to perform the actions of the method.

In general, another innovative aspect of the subject matter described in this specification may be embodied in methods that include the actions of determining that a web resource includes a trigger term, obtaining a modified version of the web resource, where the modified version of the web resource includes an answer box gadget in association with the trigger term, obtaining a parametric value associated with the trigger term, determining that the user has selected the answer box gadget, and responsive to determining that the user has selected the answer box gadget, providing the parametric value for output.

In general, another innovative aspect of the subject matter described in this specification may be embodied in methods that include the actions of identifying a trigger term that is included in a web resource, receiving a parametric value associated with the trigger term, generating a modified version of the web resource, where the modified version of the web resource associates a control and the parametric value with the trigger term, receiving a signal that indicates that the user has selected the control, and in response to receiving the signal, outputting the parametric value.

In general, another innovative aspect of the subject matter described in this specification may be embodied in methods that include the actions of selecting a trigger term that occurs in a resource, modifying the web resource to include a user interface element, determining a parametric value that is associated with the trigger term, receiving a user selection of the user interface element, and displaying information that is representative of the parametric value.

Other embodiments of these aspects include corresponding systems, apparatus, and computer programs recorded on computer storage devices, each configured to perform the actions of the methods.

These and other embodiments may each optionally include one or more of the following features, alone or in combination. The modified version of the web resource is provided for display; obtaining a parametric value associated with the trigger term further includes executing a search query using the trigger term as a query term, and obtaining, as the parametric value, one or more search results of the search query; obtaining a modified version of the web resource further includes generating the modified version of the web resource, by a client device; obtaining a modified version of the web resource further includes providing information that identifies the web resource to a search engine, and responsive to providing the information, receiving the modified version of the web resource from the search engine; obtaining a parametric value associated with the trigger term further includes obtaining the parametric value associated with the trigger term responsive to determining that the user has selected the answer box gadget; the modified version of the web resources associates the answer box gadget and the parametric value with the trigger term; providing the parametric value for output further includes launching a media player application that plays a source that is identified by the parametric value; providing the parametric value for output further includes generating a pop-up window that displays the parametric value; detecting that the user has selected the answer box gadget further includes detecting that the user has selected a hyperlink associated with the trigger term, that the user has selected an icon that is displayed adjacent to the trigger term, or that a mouse event has occurred in connection with the trigger term; determining that the web resource includes a trigger term further includes automatically parsing the web resource into candidate trigger terms, and comparing the candidate trigger terms to a list of known trigger terms; automatically parsing the web resource further includes automatically parsing the web resource by a client device, and comparing the candidate trigger terms further includes comparing the candidate trigger terms by a search engine; determining that the web resource includes a trigger term further includes determining that the web resource includes a category trigger term or a parameter trigger term; determining that the web resource includes a trigger term further includes determining that the web resource includes a name of a business, and obtaining a parametric value associated with the trigger term further includes determining a current stock price associated with the business; determining that the web resource includes a trigger term further includes determining that the web resource identifies a location, and obtaining a parametric value associated with the trigger term further includes obtaining a map of the location, or current time or current weather information associated with the location; and/or determining that the web resource includes a trigger term further includes determining that the web resource includes two or more trigger terms, and selecting, as the trigger term, one of the two or more trigger terms.

Particular embodiments of the subject matter described in this specification may be implemented so as to realize one or more of the following advantages. Information regarding some terms in a web page being visited may be pushed to the user, or be made much easier for the user to access, when the user visits a particular web page, without requiring the user to copy the term as a query term and paste it in a search engine interface to conduct a separate search for the relevant information regarding that term. Also, because the relevant information of any terms that are identifiable in any snippets of a search result are readily accessible to the user, the user may enjoy a better user experience when browsing through the search results.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
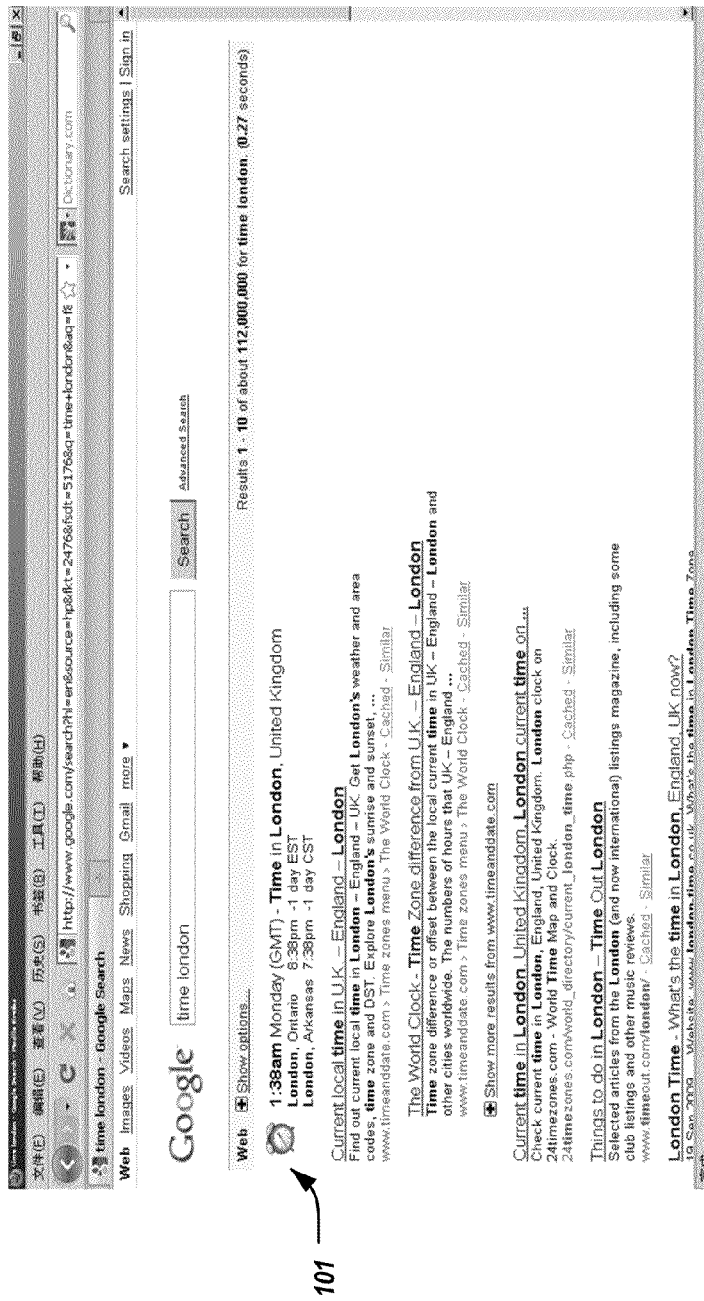
FIG. 1 illustrates a conventional application of a answer box in a search result.
Figure 2:
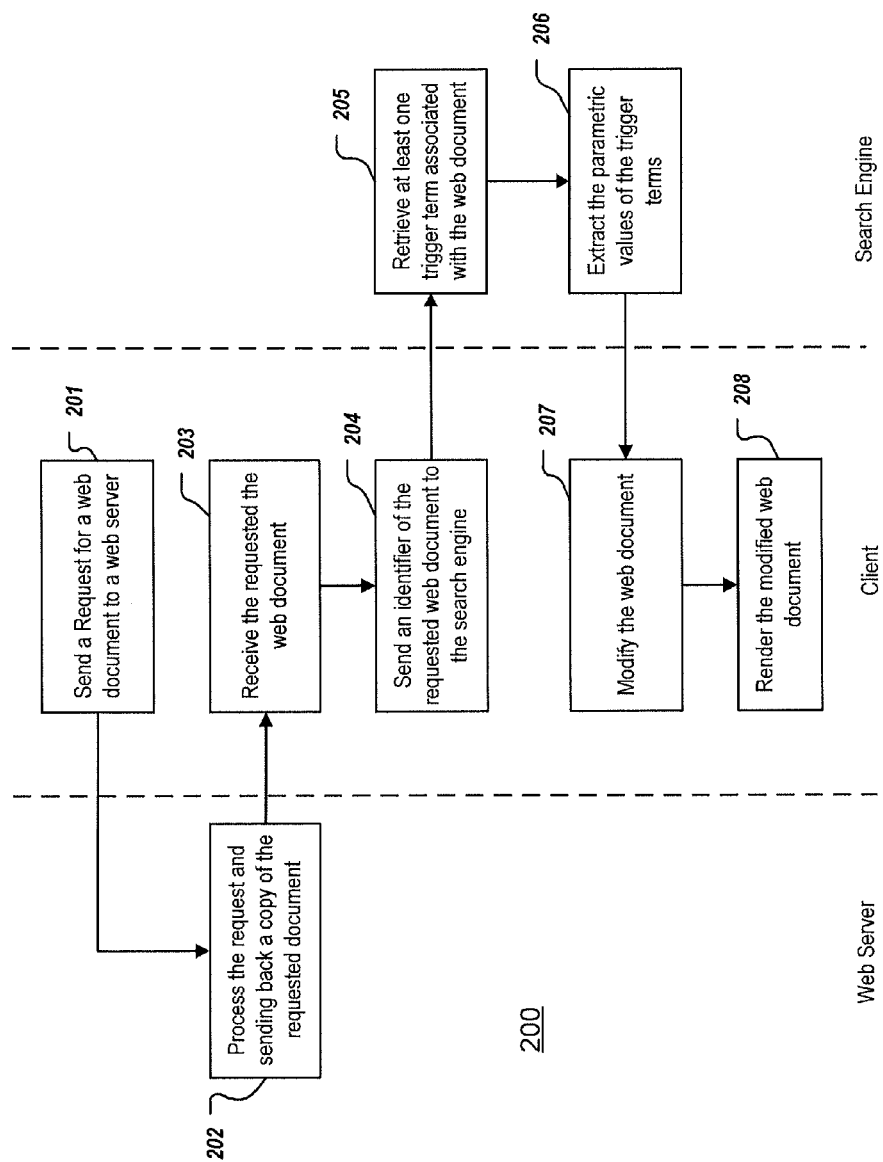
FIG. 2 is a flow chart illustrating a process for presenting enriched web content.
Figure 3:
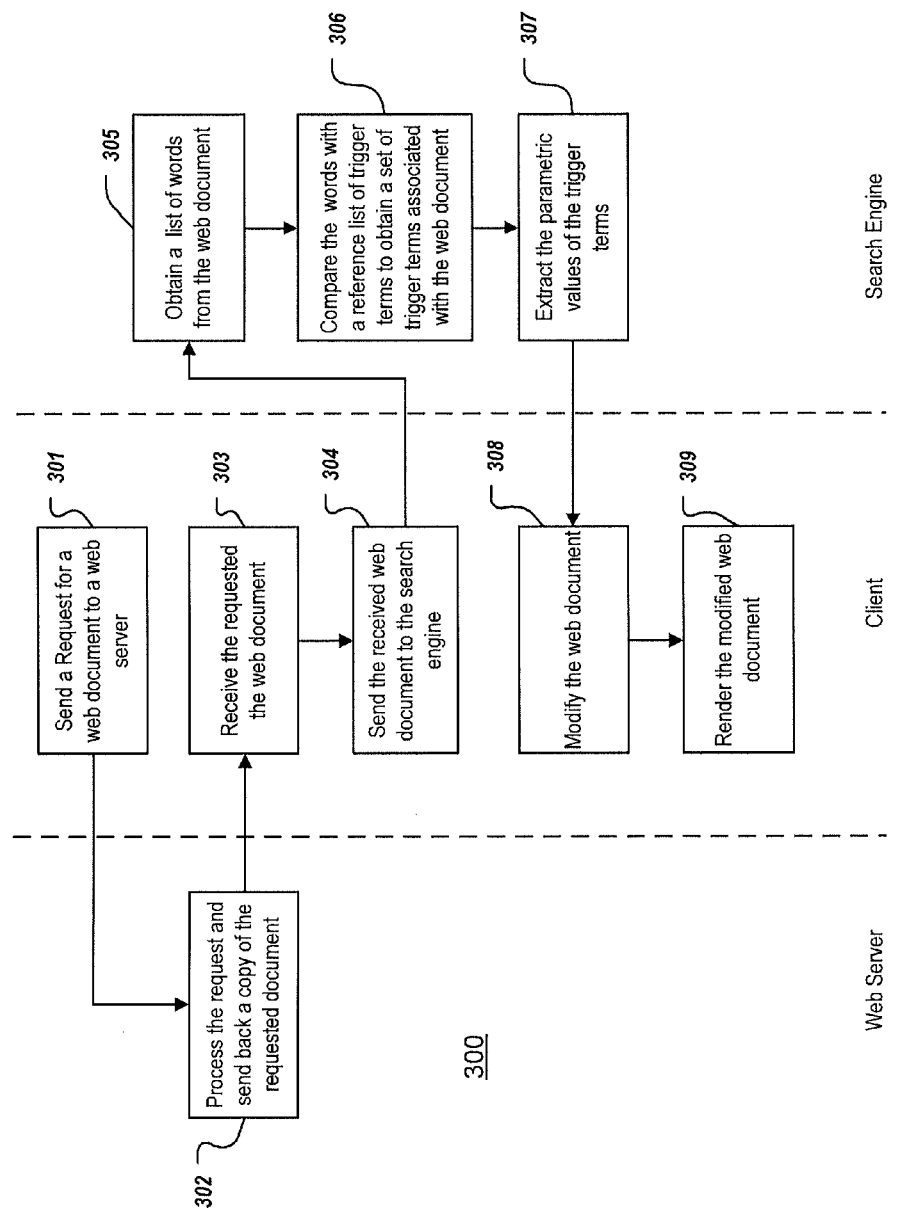
FIG. 3 is a flow chart illustrating another process for presenting enriched web content.

FIGS. 2 and 3 are flowcharts respectively illustrating processes 200 and 300 for presenting enriched web content. Briefly, in processes 200 and 300, a trigger term is identified in a web resource, and a modified version of the web resource is obtained, where the modified version of the web resource associates an answer box gadget with the trigger term. A parametric value associated with the trigger term is obtained, and the parametric value is output, for example when the user selects the answer box gadget.

Using the processes 200 and 300, the search engine sends relevant information relating to some term in a web resource on the Internet to a client device when a document is requested at the client side. For instance, trigger terms that occur in the textual content of a web page may be identified and highlighted in the user interface of a client device. When the user selects one of the highlighted trigger terms, a parametric value associated with the selected trigger term may be obtained and displayed, for example in a pop-up window that opens over the web page.

The software functions that implement processes 200 and 300 may be included in client-side scripts or browser plug-ins, which may be provided to the public for download. A website creator or publisher may obtain and include such software in the web pages that they publish on the Internet, or an end user may download and add a plug-in or toolbar to their web browser. When executed, the functions may highlight trigger terms in a web page, e.g., by either changing the font color or underlining, by inserting an additional gadget or control into the web page, by converting the trigger terms into hyperlinks, or by embedding additional information relating to other terms near these terms.

In some implementations, the web pages that are to be rendered in the browser at a client device will include the client-side functionalities of sending an identifier of the received web page or the web page itself to a search engine; receiving from the search engine a list of identified trigger terms and their associated parametric values; and modifying the web page by embedding in the web page an answer box gadget for each trigger term using the received parametric values associated with the trigger term according to a predetermined format.

The parametric values of a trigger term may include search results of a search query performed on the trigger term. The parametric value may identify a resource that may be played with a media player application, a current stock price associated with a business, or a map of a location, or current time or current weather information associated with a location. The parametric values may identify albums or reviews when the trigger term is a music artist or band, may identify reviews and show times when the trigger term is a movie or show name, may identify news articles related to the trigger term, or may identify travel conditions when the trigger term is a travel related (e.g., an airport name or flight number).

The processes 200 and 300 may be implemented in client-side scripting languages such as JavaScript or VBScript. The script functions for implementing the processes 200 and 300 include script functions that may be inserted into any appropriate web page for implementing the enrichment of web content when the web page is being loaded, as disclosed below. This set of standardized script functions may be created and distributed by a centralized publisher. For ease of reference, this particular set of script functions is referred to by this specification as "utility functions," or "answer box utility functions." This set of utility functions may have an embedded signature for easy identification of its presence in a web page.

A website owner, when creating a website, may obtain a latest version of the utility functions from the publisher, and may include them in each web page across the entire website, enabling each web page in their website to include the set of utility functions when requested by a user. Accordingly, each web page requested by a user from that website will automatically include the entire set of utility functions in a script section in the HTML document when it is sent to the requesting browser at the client device. These utility functions may then be invoked by the client device during the time the browser loads the web page, performing the functions described in processes 200 and 300.

In some implementations, the utility functions may be dynamically included into a received web page by the client device. In this case, the utility functions do not have to be first included in the web page at the server side.

A centralized publisher may also publish a utility, such as a web browser plug-in, and a user may elect to download and apply this plug-in utility in his web browser at the client device. This plug-in has the basic functionality of inserting the set of utility functions into a received web page before formally loading it in the browser. This plug-in may periodically check with a publishing server to update itself with the latest version of the set of utility functions and any other functionalities of this plug-in for easy operation.

Once the plug-in is installed in a web browser, a user may choose to disable or enable this plug-in. When it is enabled, the plug-in will check whether a requested and received web page already includes the set of utility functions by verifying the existence of a signature in the received web page. If the plug-in determines that the utility functions have already been included in the received web page, the plug-in utility will skip the operation of inserting the set of utility functions and let the web browser run the script code directly during the loading process. If the plug-in finds that no utility functions are included in the received web page, the plug-in will modify the received web page by inserting the utility functions into the web page, and then present the modified web page to the browser for loading and running the relevant utility functions.

When the plug-in is disabled by the user, no check will be performed on the received web page and therefore no insertion of utility functions will happen at the client side, regardless of whether the received web page already includes the set of answer box utility functions or not. However, in the latter case, if the received web page includes the set of utility functions, the script functions will still be run to perform the following processes.

Alternatively, a web proxy server may be used for accessing third-party web pages. In this case, a user accesses a web page through a browser, and the browser sends a request to the web proxy server. The proxy server will request and obtain the target web page, add the set of utility functions to the web page if it finds the web page does not already have them, and send the page to the requesting browser.

When the web browser loads a web page that includes the set of utility functions loaded by a web browse, a first script function from the set of utility functions will be invoked and executed to send an identifier of the web page, such as the URL of the web page or some or all of the content of the web page, to a front end server of a search engine. The front end server may be configured to receive the identifier of the web page, and then communicate with a back end server of the search engine to find if the web page has already been processed by the search engine. If so, the back end retrieves a set of trigger terms already obtained from the web page by the search engine and sends the trigger terms to the front end.

Otherwise, the back end may proceed to obtain the web page at the exact URL, obtain any trigger terms in the web page, and then send the trigger terms to the front end. Based on the trigger terms obtained from the back end, the front end will in turn retrieve a set of parametric values previously associated with each of these trigger terms, and send these trigger terms together with their associated parametric values to the requesting client device.

Alternatively, the above operation of retrieving the parametric values associated with each of the trigger terms may also take place at the back end. The separation of the back end and front end is optional.

In some implementations, the search engine stores web pages crawled from the Internet in a storage cache. These cached web pages have already been parsed by the search engine, and a set of trigger terms associated with each web page have been extracted and stored for each cached web page. When the browser sends only a URL of the web page to the search engine and the same web page may be found in its cached storage, the search engine does not have to perform the operation of extracting the trigger terms on the fly.

Referring specifically process 200 of FIG. 2, a client device, e.g., one running a web browser, sends 201 a request for a particular web page. A web server hosting the requested web page processes 202 that request and sends back a copy of the requested web page. The client device receives 203 the requested web page. The web page will have (or may get) a set of utility functions in the script portion of the file at the client side.

The browser then loads the web page and calls the set of utility functions. The execution of the utility functions causes the URL of the web page to be sent 204 to a search engine. The search engine, upon receiving the URL of the web page, checks its cached storage for the corresponding cached copy of the web page, and determines that the web page includes a trigger term. Determining that the web page includes a trigger term may include automatically parsing the web page into candidate trigger terms, and comparing the candidate trigger terms to a list of known trigger terms, such as a list of known category trigger terms (e.g., "weather," "time," "stock") or a list of known parameter trigger terms (e.g., business, people or place names). The search engine retrieves 205 the trigger terms that are associated with this cached copy of the web page.

The candidate trigger terms may be filtered to exclude those trigger terms that require a parameter that is not included in the web page. For instance, the candidate trigger term "time" may be excluded as a candidate trigger term if a location parameter is required, and if the term following the trigger term "time" on the web page does not reference a location.

For each trigger term, the search engine obtains or extracts 206 the respective relevant parametric values by invoking an answer box search with that trigger term. This answer box search may be performed on the local search engine, or on a third party service provider through a call to a web service, for example. The returned parametric values include at least one value indicating the type of the answer box for this trigger term, that will be used in determining the layout and presentation of other parametric values that provide relevant information for this trigger term.

Where more than one trigger term is found in a particular web resource, a subset of the trigger terms may be selected for further processing, where the subset includes fewer than all of the trigger terms. The selection of fewer than all of the trigger terms may serve to reduce visual clutter on the modified web page, and to reduce the risk of overwhelming the user with unnecessary or unhelpful information. The trigger terms that are selected may include the first few trigger terms (e.g., the first five or ten trigger terms), trigger terms or categories of trigger terms that the user has selected through a user preference options, or trigger terms or categories of trigger terms that the user has (or other users have) frequently selected in the past.

A particular data type or format is used to transmit these parametric values. For example, the parametric values may be retrieved and transmitted in the form of an array of strings, or these data may simply be defined using XML and transmitted as a string, or using JavaScript Object Notation (JSON).

Upon receiving the set of trigger terms and their respective parametric values, the browser modifies 207 the web page already received from the web server, thereby generating a modified version of the web page. The modified version of the web page is rendered 208 in the browser to the user. Based on the value of the type of the answer box for each trigger term, a plurality of corresponding script functions will be called to insert at least some of the parametric values associated with the trigger term into the places around that trigger term in the web page, or at least to implement a mechanism (e.g., a rollover) for easy retrieval of the information relevant to these trigger terms, thereby achieving the effect of pushing the information relevant to each trigger term to the client side for easy access by a user.

Considering the possibility that the cached copy of the web page at the search engine may have been older than the actual web page received at the browser, the textual content of the cached web page may not be exactly the same as that of the web page received at the client device; therefore, the trigger terms identified based on the cached web page may not all be identifiable in the actual web page received at the client browser. In this case, only the trigger terms that may be found in the web page received at the browser will be further processed, and those that cannot be found in the actual web page may simply be discarded for processing efficiency.

FIG. 3 is a flow chart illustrating another process 300 for presenting enriched web content. Process 300 is different from the process 200 of FIG. 2 in that, instead sending an identifier of the web page to the search engine, some or all of the content of the web page itself is sent to the server for further processing in order to retrieve the trigger terms in the web page and their corresponding parametric values.

Performing the process 300, a client device sends 301 a request for a particular web page. A web server hosting the requested web page processes 302 that request and sends back a copy of the requested web page. The browser at the client device receives 303 the web page and loads the web page. In loading the web page, a utility function is called to send 304 all or some of the content of the received web page to a search engine. The search engine, upon receiving the content, obtains 305, from the content, a list of words.

The list of terms (referred to by this specification as "candidate trigger terms") is then compared 306 with a reference list of known trigger terms to obtain a set of trigger terms associated with the web page. For one or more of obtained trigger term of the web page, the associated parametric values are obtained 307. The set of trigger terms and their corresponding parametric values associated with the web page are then sent back to the client browser, where the web page is modified 308 using these trigger terms and the corresponding parametric values. After the modification, the web page is rendered 309 in the browser to the user. In some implementations, answer box gadgets are implemented for the trigger terms identified in the snippets of the search results.

Search results, such as those obtained by submitting a search request to a search engine, may include an answer box as a result. The remaining search results presented include links to web resources, and snippets from the web resources, where the snippets include the query terms. An answer box gadget or control is provided for each word in the snippets that is identified as a trigger term, for the user to have easy access to the relevant information of that particular trigger term. User selection of an answer box gadget initiates the generation of a signal by the client device, the signal indicating to the client device or the search engine that the user has selected a particular gadget, and that parametric information associated with the answer box gadget is to be shown. User selection may occur, for example, using a keyboard keystroke or by way of a mouse event.

After a user submits a search request to a search engine, the search engine processes the snippets extracted from responsive documents (or cached versions of them) to determine if any trigger terms exist in these snippets. If a trigger term is identified in a snippet, the relevant information will be retrieved for this trigger term either from the search engine or from an external source, and this information is structured to be presented in an answer box gadget around the trigger term in the snippet. In this way, the entire set of snippets will be parsed for any potential trigger terms, and each such trigger term (or some subset thereof) will have an answer box gadget implemented for presenting the relevant information relating to this trigger term.

Figure 4:
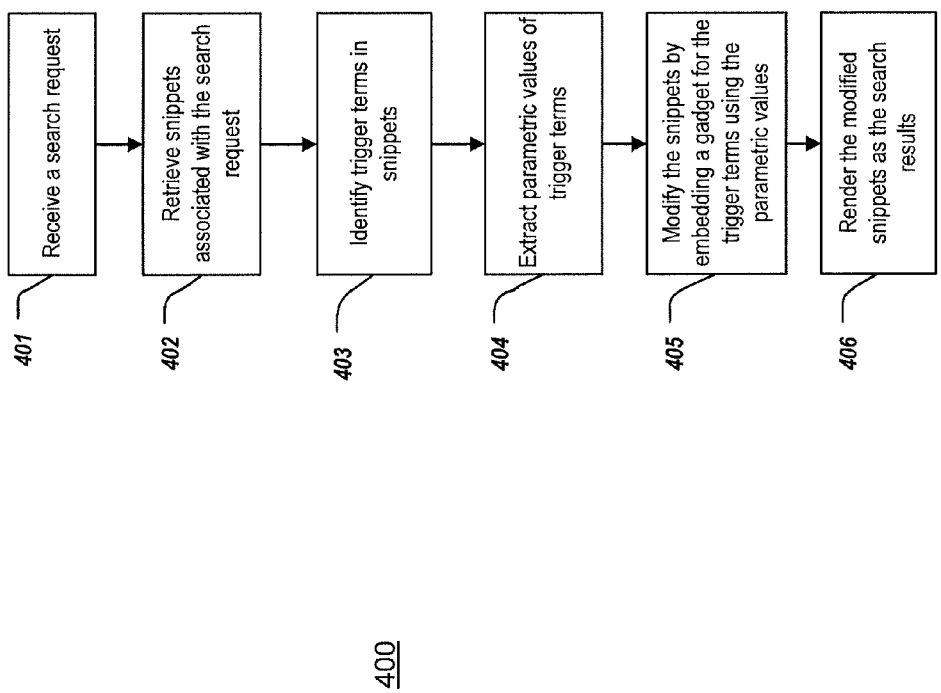
FIG. 4 is a flow chart illustrating a process for presenting enriched search results.

FIG. 4 is a flow chart illustrating a process 400 for presenting enriched search results. A user conducts a search by inputting a search query into a field of an interface to a search engine. The search engine receives 401 the search request, parses the search query and looks for any relevant snippets containing the search query from web pages stored in the cached storage of the search engine that are responsive to the query. Each of these snippets is retrieved 402 from the cached storage and is further processed to identify 403 any trigger terms that may exist in these snippets.

Furthermore, the associated parametric values of each of these trigger terms are extracted 404. With a set of trigger terms and their associated parametric values, the search engine proceeds to modify 405 one or more of the retrieved snippets by embedding an answer box gadget for each trigger term. After the snippets have been modified for any trigger terms with its text body, the modified snippets are finally sent to the requesting client device and rendered 406 in a browser at the client device.

In addition, as the natural language of the textual content of a web page may be in any language, different approaches may apply when the search engine parses the textual content of a web page. Generally, in agglutinative languages, such as Chinese, Japanese or Korean, words may be compounded without spaces separating the component words. In parsing a crawled web page that is in Chinese, for example, the search engine will apply word splitting first to determine component Chinese characters of a compound word before identifying the trigger terms in a web page.

Figures 5A, 5B, 5C:
FIG. 5A shows as an example portion of a modified web page with enriched content.
FIG. 5B shows as an example portion of a modified page with some applications embedded.
FIG. 5C shows an example portion of a web page of search results with enriched information.

FIG. 5A shows as an example portion of a modified web page that includes enriched content. In this figure, some additional information and functions are added to the web page for some trigger terms found in the text, such as a name of a listed company. The section 501 contains a trigger term "招商银行 (Merchants Bank)," an icon in the shape of a stock price graph, and a decimal number "16.02". The trigger term "招商银行" is a term that originally exists in the web page before being modified. This term is identified as the name of a listed company, from a list of known trigger terms.

The icon and the decimal number "16.02" are embedded in the text of the web page during the modification. When a user moves the pointer above the icon, the script will be invoked, generating a signal which indicates that the user has selected the icon. The real time or near real time information of the stock price will be retrieved from a stock data provider and displayed graphically in a popup window. The decimal number "16.02" is the real time or near real time stock price for the listed company "招商银行", extracted from the stock data provider during the modification of the web page.

FIG. 5B shows as an example part of a modified page with an application embedded around a trigger term. In the section 502, the characters "同桌的你" in the original web page were parsed and identified as the title of a song and hence a trigger term. The relevant source of a trial version of the audio file of this song is retrieved. An icon for playing the audio source is inserted after the title of the song, followed by the phrase "试听 (trial listening)" for the user to easily recognize this play function. In this case, the embedded gadget for the trigger term "同桌的你" invokes the application for playing an audio file located remote from the client device.

FIG. 5C shows an example portion of a web page of search results with enriched information. In this figure, besides the topmost result, which is produced by a dynamic answer box for displaying news, the snippets in the following results also contain answer box gadgets for presenting additional information about each trigger term identified in these snippets. Section 503 shows a trigger term "深圳", which is the name of a city in China, a weather icon, and the word "大雨 (heavy rain)." By parsing the textual contents of the original web page, the term "深圳" is identified as the name of a city and hence a trigger term.

Specialized code is applied to this trigger term and the relevant weather information and function are extracted and created for this trigger term during the modification. A weather icon and the textual content explaining the real time weather condition in this city, namely "大雨", are embedded after the text of the city name "深圳". Because the weather icon shows an image of a cloudy sky, and is thus evocative of the current weather conditions, the weather icon is said to include information that is representative of the parametric value. A user may move his pointer on to the weather icon to trigger an answer box gadget or script that in turn retrieves the latest weather information from a weather service provider and displays this information in a popup window according to predetermined display formats defined for that particular type of data.

It should be noted that, the answer box gadget embedded in the web page for a particular trigger term may also include or invoke a video application (e.g., ADOBE FLASH), or any other applications that may be embedded in and/or invoked from a web page.

Embodiments of the subject matter and the functional operations described in this specification may be implemented in digital electronic circuitry, in tangibly-embodied computer software or firmware, in hardware, including the structures disclosed in this specification and their structural equivalents, or in combinations of one or more of them. Embodiments of the subject matter described in this specification may be implemented as one or more computer programs, i.e., one or more modules of computer program instructions encoded on a computer storage medium for execution by, or to control the operation of, data processing apparatus. Alternatively or in addition, the program instructions may be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium may be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, software application, script, or code) may be written in any form of programming language, including compiled or interpreted languages, or declarative or procedural languages, and it may be deployed in any form, including as a stand-alone program or as a module, component, subroutine, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
 a client device comprising one or more processors; and
 a computer-readable medium coupled to the one or more processors having instructions stored thereon which, when executed by the one or more processors, cause the one or more processors to perform operations comprising:
 receiving, by the client device, a web resource from a server;
 determining, by the client device, that the web resource includes a particular trigger term, from among a predefined set of trigger terms that are associated with answer box search queries, wherein an answer box search query is a search query for which a search engine responds with an answer to a search query instead of with links to web resources;
 generating, by the client device, a modified version of the web resource, wherein the modified version of the web resource includes an answer box gadget in association with the particular trigger term;
 providing, by the client device, the modified version of the web resources, including the answer box gadget, for display to a user of the client device;
 determining, by the client device, that the user has selected the answer box gadget;
 in response to determining that the user has selected the answer box gadget, transmitting, by the client device, an answer box search query to the search engine, wherein the answer box search query indicates the particular trigger term;
 receiving, by the client device, an answer to the answer box search query from the search engine; and
 providing, by the client device, a representation of the answer to the answer box search query for display.

2. The system of claim 1, wherein providing the representation of the answer to the answer box search query for display further comprises launching a media player application that plays a source that is identified by the answer to the answer box search query.

3. The system of claim 1, wherein providing the representation of the answer to the answer box search query for display further comprises generating a pop-up window that displays the representation of the answer to the answer box search query.

4. The system of claim 1, wherein determining that the user has selected the answer box gadget further comprises detecting that the user has selected a hyperlink associated with the particular trigger term, that the user has selected an icon that is displayed adjacent to the particular trigger term, or that a mouse event has occurred in connection with the particular trigger term.

5. The system of claim 1, wherein determining that the web resource includes the particular trigger term further comprises:
 automatically parsing the web resource into candidate trigger terms; and
 comparing the candidate trigger terms to the predefined set of trigger terms.

6. The system of claim 1, wherein determining that the web resource includes the particular trigger term further comprises determining that the web resource includes a category trigger term associated with a particular category of answer box search queries.

7. The system of claim 1, wherein determining that the web resource includes the particular trigger term further comprises determining that the web resource includes a parameter trigger term associated with a particular name or location that triggers the client device to transmit to the search engine the answer box search query.

8. The system of claim 1, wherein:
 determining that the web resource includes the particular trigger term further comprises determining that the web resource includes a name of a business; and
 providing the representation of the answer to the answer box search query further comprises providing a current stock price associated with the business for display.

9. The system of claim 1, wherein:
 determining that the web resource includes the particular trigger term further comprises determining that the web resource identifies a location; and
 providing the representation of the answer to the answer box search query further comprises providing a map of the location, or current time or current weather information associated with the location for display.

10. The system of claim 1, wherein determining that the web resource includes the particular trigger term further comprises:
 determining that the web resource includes two or more trigger terms, and
 selecting, as the particular trigger term, one of the two or more trigger terms.

11. The system of claim 1, wherein determining that the web resource includes the particular trigger term further comprises:
 receiving, by the client device, the predefined set of trigger terms; and
 determining that the web resource includes the particular trigger term from among the predefined set of trigger terms received by the client device.

12. The system of claim 1, wherein generating the modified version of the web resource further comprises:
 determining that an option for enabling the answer box gadget is activated on the client device;
 and in response to determining that the option for enabling the answer box gadget is activated on the client device, generating the modified version of the web resource to include the answer box gadget.

13. The system of claim 1, wherein the answer box gadget includes an icon that is associated with a category of the particular trigger term.

14. A computer-implemented method comprising:
 receiving, by a client device, a web resource from a server;
 determining, by the client device, that the web resource includes a particular trigger term, from among a predefined set of trigger terms that are associated with answer box search queries, wherein an answer box search query is a search query for which a search engine responds with an answer to a search query instead of with links to web resources;

generating, by the client device, a modified version of the web resource, wherein the modified version of the web resource includes an answer box gadget in association with the particular trigger term;

providing, by the client device, the modified version of the web resources, including the answer box gadget, for display to a user of the client device;

determining, by the client device, that the user has selected the answer box gadget;

in response to determining that the user has selected the answer box gadget, transmitting, by the client device, an answer box search query to the search engine, wherein the answer box search query indicates the particular trigger term;

receiving, by the client device, an answer to the answer box search query from the search engine; and providing, by the client device, a representation of the answer to the answer box search query for display.

15. The method of claim 14, wherein providing the representation of the answer to the answer box search query for display further comprises launching a media player application that plays a source that is identified by the answer to the answer box search query.

16. The method of claim 14, wherein providing the representation of the answer to the answer box search query for display further comprises generating a pop-up window that displays the representation of the answer to the answer box search query.

17. The method of claim 16, wherein determining that the user has selected the answer box gadget further comprises detecting that the user has selected a hyperlink associated with the particular trigger term, that the user has selected an icon that is displayed adjacent to the particular trigger term, or that a mouse event has occurred in connection with the particular trigger term.

18. The method of claim 14, wherein determining that the web resource includes the particular trigger term further comprises:
automatically parsing the web resource into candidate trigger terms; and
comparing the candidate trigger terms to the predefined set of trigger terms.

19. The method of claim 14, wherein determining that the web resource includes the particular trigger term further comprises determining that the web resource includes a category trigger term associated with a particular category of answer box search queries.

20. The method of claim 14, wherein determining that the web resource includes the particular trigger term further comprises determining that the web resource includes a parameter trigger term associated with a particular name or location that triggers the client device to transmit to the search engine the answer box search query.

21. The method of claim 14, wherein:
determining that the web resource includes the particular trigger term further comprises determining that the web resource includes a name of a business; and
providing the representation of the answer to the answer box search query further comprises providing a current stock price associated with the business for display.

22. The method of claim 14, wherein:
determining that the web resource includes the particular trigger term further comprises determining that the web resource identifies a location; and
providing the representation of the answer to the answer box search query further comprises providing a map of the location, or current time or current weather information associated with the location for display.

23. The method of claim 14, wherein determining that the web resource includes the particular trigger term further comprises:
determining that the web resource includes two or more trigger terms, and
selecting, as the particular trigger term, one of the two or more trigger terms.

24. A non-transitory computer-readable medium storing software comprising instructions executable by one or more computers which, upon such execution, cause the one or more computers to perform operations comprising:
receiving, by a client device, a web resource from a server;
determining, by the client device, that the web resource includes a particular trigger term, from among a predefined set of trigger terms that are associated with answer box search queries, wherein an answer box search query is a search query for which a search engine responds with an answer to a search query instead of with links to web resources;
generating, by the client device, a modified version of the web resource, wherein the modified version of the web resource includes an answer box gadget in association with the particular trigger term;
providing, by the client device, the modified version of the web resources, including the answer box gadget, for display to a user of the client device;
determining, by the client device, that the user has selected the answer box gadget;
in response to determining that the user has selected the answer box gadget, transmitting, by the client device, an answer box search query to the search engine, wherein the answer box search query indicates the particular trigger term;
receiving, by the client device, an answer to the answer box search query from the search engine; and
providing, by the client device, a representation of the answer to the answer box search query for display.

25. The medium of claim 24, wherein providing the representation of the answer to the answer box search query for display further comprises launching a media player application that plays a source that is identified by the answer to the answer box search query.

26. The medium of claim 24, wherein providing the representation of the answer to the answer box search query for display further comprises generating a pop-up window that displays the representation of the answer to the answer box search query.

27. The medium of claim 24, wherein determining that the user has selected the answer box gadget further comprises detecting that the user has selected a hyperlink associated with the particular trigger term, that the user has selected an icon that is displayed adjacent to the particular trigger term, or that a mouse event has occurred in connection with the particular trigger term.

28. The medium of claim 24, wherein determining that the web resource includes the particular trigger term further comprises:
automatically parsing the web resource into candidate trigger terms; and comparing the candidate trigger terms to the predefined set of trigger terms.

29. The medium of claim 24, wherein determining that the web resource includes the particular trigger term further comprises determining that the web resource includes a category trigger term associated with a particular category of answer box search queries.

30. The medium of claim 24, wherein determining that the web resource includes the particular trigger term further comprises determining that the web resource includes a parameter trigger term associated with a particular name or location that triggers the client device to transmit to the search engine the answer box search query.

31. The medium of claim 24, wherein:
determining that the web resource includes the particular trigger term further comprises determining that the web resource includes a name of a business; and
providing the representation of the answer to the answer box search query further comprises providing a current stock price associated with the business for display.

32. The medium of claim 24, wherein:
determining that the web resource includes the particular trigger term further comprises determining that the web resource identifies a location; and
providing the representation of the answer to the answer box search query further comprises providing a map of the location, or current time or current weather information associated with the location for display.

33. The medium of claim 24, wherein determining that the web resource includes the particular trigger term further comprises:
determining that the web resource includes two or more trigger terms, and
selecting, as the particular trigger term, one of the two or more trigger terms.

* * * * *